(12) United States Patent
Hastilow

(10) Patent No.: US 8,218,001 B2
(45) Date of Patent: Jul. 10, 2012

(54) PERFORMING A PROCESS ON A WORKPIECE

(75) Inventor: Neil K. Hastilow, Bristol (GB)

(73) Assignee: Rolls-Royce PLC, London (GB)

( * ) Notice: Subject to any disclaimer, the term of this patent is extended or adjusted under 35 U.S.C. 154(b) by 917 days.

(21) Appl. No.: 12/289,841

(22) Filed: Nov. 5, 2008

(65) Prior Publication Data
US 2009/0213216 A1    Aug. 27, 2009

(30) Foreign Application Priority Data
Feb. 21, 2008    (GB) .................................. 0803088.4

(51) Int. Cl.
*H04N 9/47* (2006.01)
*H04N 7/18* (2006.01)

(52) U.S. Cl. ............................... 348/92; 348/94; 348/95

(58) Field of Classification Search ................ 348/92, 348/94, 95
See application file for complete search history.

(56) References Cited

U.S. PATENT DOCUMENTS

| | | | |
|---|---|---|---|
| 5,418,345 A | 5/1995 | Adamski | |
| 6,380,512 B1 | 4/2002 | Emer | |
| 6,610,961 B1 | 8/2003 | Cheng | |
| 6,611,731 B2 | 8/2003 | Duffin | |
| 6,650,779 B2 * | 11/2003 | Vachtesvanos et al. | ....... 382/228 |
| 2001/0044669 A1 | 11/2001 | Koduri et al. | |
| 2003/0004606 A1 | 1/2003 | Duffin | |

FOREIGN PATENT DOCUMENTS

| | | |
|---|---|---|
| JP | A-62-152608 | 7/1987 |
| JP | A-2004-283998 | 10/2004 |

OTHER PUBLICATIONS

May 25, 2009 Extended European Search Report issued in corresponding European Patent Application No. 08019235.4-2206.
Chou et al., "Excimer laser irradiation induced suppression of off-state leakage current in organic transistors," *Applied Physics Letters*, vol. 90, No. 222103, 2007.

* cited by examiner

*Primary Examiner* — Kristie Shingles
(74) *Attorney, Agent, or Firm* — Oliff & Berridge, PLC

(57) ABSTRACT

Features such as holes in a component which may be an aerofoil component of a gas turbine engine are re-drilled after initial formation, for example to remove blockages created in a coating process. In order to ensure that re-drilling occurs at the precise location of the initial holes, a selected number of the holes are selected, and their exact positions identified, for example by camera imaging and image processing. The actual positions of the selected features are compared with the nominal positions, and an algorithm is generated and then used to calculate the actual positions of the non-selected holes of the array.

15 Claims, 2 Drawing Sheets

PERFORMING A PROCESS ON A WORKPIECE

This invention relates to a method of, and apparatus for, performing a process on a workpiece, and is particularly, although not exclusively, concerned with the re-drilling of cooling holes in a component such as a turbine blade or nozzle guide vane of a gas turbine engine.

Cooling holes in gas turbine engine components are often formed during the initial machining of the cast component, for example by laser drilling. After this machining process, some components are provided with a coating, such as a thermal barrier coating. The coating can partially or completely block the drilled holes, and consequently it is necessary for the holes to be re-drilled after the coating has been applied. It is important for the re-drilling to be performed accurately, at the positions of the original holes.

When machining and other operations are carried out on aerofoil components such as turbine blades and nozzle guide vanes, the components are supported by a fixture. The complex shape of such components makes it very difficult to align the component accurately in the machine tool if it is moved from one fixture to another. U.S. Pat. No. 6,611,731 discloses a method of micro-machining cooling holes in an aerofoil, in which the aerofoil is aligned using a coordinate measuring machine (CMM) which employs a probe that contacts the component at different positions in order to derive the position and orientation of the component so that the cooling holes can be machined in the correct positions.

If such a process is to be applied to the re-drilling of existing holes, the problem arises that, even if the aerofoil is correctly aligned for the re-drilling operation, the holes will not necessarily be in the expected positions. Process variations in the original machining of the holes can mean that they do not lie in their nominal positions on the surface of the aerofoil, and so the re-drilling process will be unpredictable. Cooling holes are usually formed as arrays, and a single aerofoil component may have more than one array of holes. The holes of each array will normally have good hole-to-hole tolerances but the positional accuracy of the array on the component may be less accurate. Different arrays of holes may be formed in different operations, involving the mounting of the component in different fixtures. The deviation from the nominal positions may vary between different arrays on the same component.

U.S. Pat. No. 6,380,512 discloses a laser drilling process for removing coating material obstructing cooling holes of a gas turbine component. Drilling is conducted by a CNC machine which is programmed with the specifications for the cooling hole locations. The machine includes a camera which is moved to the specified location of each hole, and then, by image analysis, determines the actual location of the hole. Drilling then takes place at the actual locations. If a hole is not visible to the camera, for example if it is completely blocked by the coating, the actual location of that hole is calculated on the basis of a comparison between the actual and specified locations of the previous hole.

The need to conduct image analysis on every hole is consuming of both time and computer processing power, since each hole has to be visually identified, the camera image has to be analysed, the position of the central axis of the hole has to be calculated, and the resulting data for all of the holes has to be stored. Furthermore, the functionality of such systems is limited, since they are able to make adjustments only in two dimensions for holes that cannot be identified by the camera. In other words, provided that analysis of camera images of some of the holes in a two dimensional linear array can be made, actual positions of any remaining holes in the linear array can be calculated since it is necessary to establish only where along the linear array the hole is situated. However, such systems cannot calculate actual hole positions where errors occur in three dimensional space, as is common in complex hole arrays on aerofoil components.

Furthermore compound positional errors when initially drilling the cooling holes can result in the introduction of scaling errors into the hole positions. Current systems are unable to deal with such scaling errors.

According to one aspect of the present invention there is provided a method of performing a process on an existing array of features on a workpiece supported on a fixture, the method comprising:
  i) selecting at least three, but not all, of the features of the array;
  ii) identifying the nominal position in a coordinate space of each of the selected features, and generating a nominal position data set for the selected features;
  iii) identifying the actual position in the coordinate space of each of the selected features, and generating an actual position data set for the selected features;
  iv) generating an algorithm to transform the nominal position data set to the actual position data set;
  v) applying the algorithm to the nominal positions of the non-selected features of the array to generate actual positions of the non-selected features;
  vi) performing the process on the selected and non-selected features at the respective identified and generated actual positions.

The nominal positions of the selected features may be obtained from data stored in a memory of a coordinate measuring machine.

The actual positions of the selected features may be obtained by capturing and analysing a camera image of each selected feature. The process may be performed by means of a laser, for example it may be a laser drilling process. The camera image may then be obtained through the optical system of the laser. The analysis of the image may be performed by a computer.

The algorithm may be generated by performing a best-fit alignment of the actual position data set with the nominal position data set, and calculating the offset between the actual and nominal position data sets. The algorithm may include a scaling factor. That is to say, the algorithm may include a scaling factor in the X, Y and/or Z directions. Alternatively, the algorithm may include scaling factors for each of the X, Y and Z directions.

The workpiece may be an aerofoil component of a gas turbine engine, and the features may be cooling air holes in the aerofoil component.

The process may comprise the re-drilling of the cooling air holes. In an alternative method, the process may comprise the formation of shaped features at the cooling air holes.

According to another aspect of the present invention, there is provided apparatus for performing a method as defined above, the apparatus comprising:
  i) a memory for storing the nominal position data set and the actual position data set;
  ii) a camera;
  iii) a coordinate measuring machine for displacing the camera to camera positions corresponding to the nominal positions of the respective selected features;
  iv) image analysis means for receiving images from the camera and identifying the actual positions of the respective features;

v) processing means for generating the algorithm and subsequently calculating the actual positions of the non-selected features;

vi) processing means for performing the process on the features at the respective actual positions.

For a better understanding of the present invention, and to show more clearly how it may be carried into effect reference will no be made, by way of example to the accompanying drawings in which.

Figure 1:
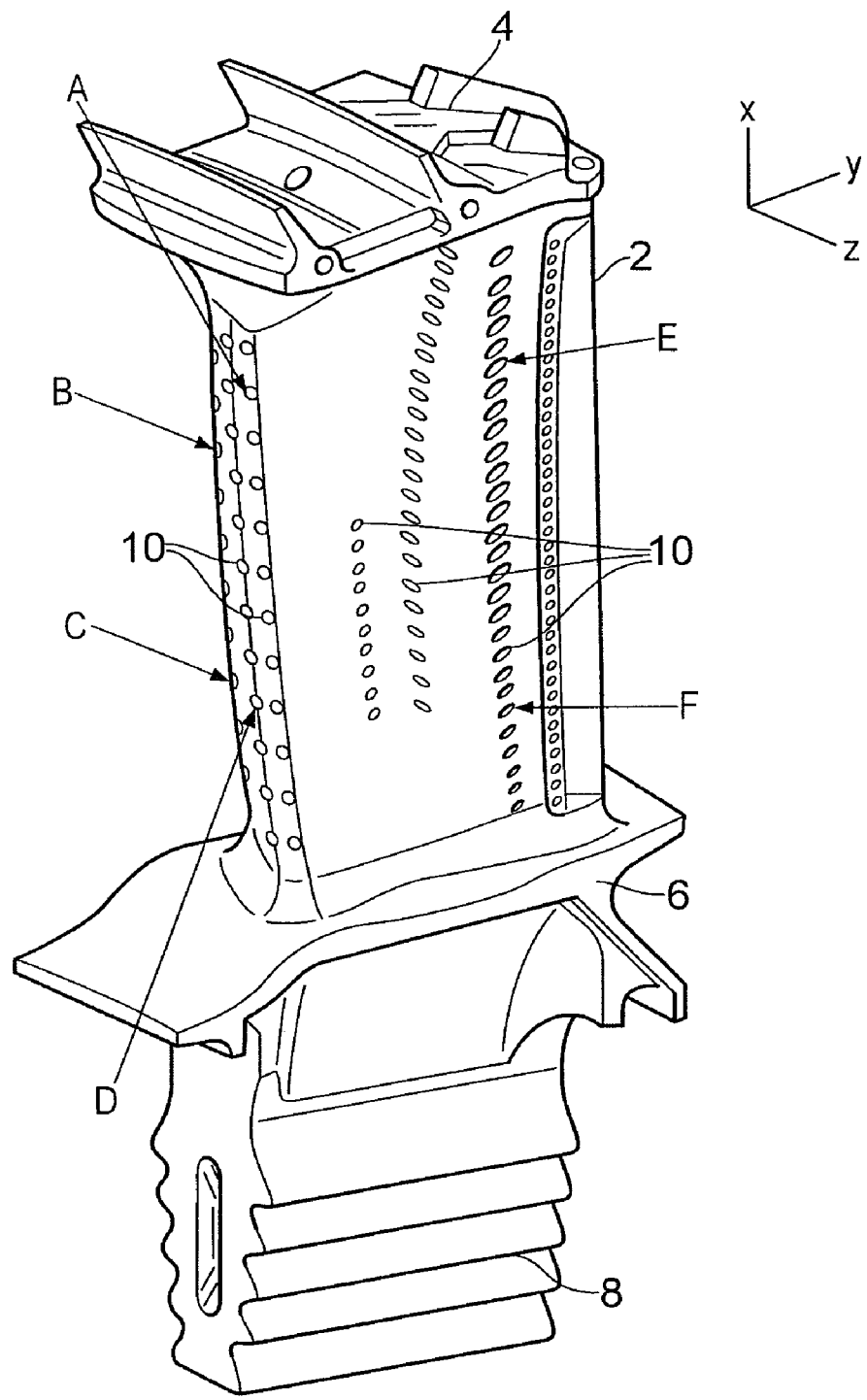
FIG. 1 shows a nozzle guide vane of a gas turbine engine.

The nozzle guide vane (NGV) of FIG. 1 comprises an aerofoil portion 2 having an outer shroud segment 4 at its radially outer end and an inner shroud segment 6 at its radially inner end. A fir tree attachment portion 8 extends radially inwardly from the inner shroud 6. The aerofoil portion 2 has internal passages which, in operation of a gas turbine engine in which the NGV is installed, receive cooling air extracted from a compressor of the engine. The internal passages communicate with the exterior through cooling holes 10 disposed in arrays over the surface of the aerofoil portion 2. The pressure side of the aerofoil portion 2 is visible in FIG. 1; further arrays of cooling holes are present on the suction side of the aerofoil portion 2.

In the manufacturing process of the NGV, a workpiece made from a suitable high temperature metal alloy is subjected to various finishing processes, such as machining to form the profiles of the shroud portions 4 and 6 and the attachment portion 8, drilling to form the cooling holes 10, and the application of a coating over those surfaces which are subjected, in use, to hot gas flows. The workpiece may be formed by casting or any other suitable process.

In order to support the NGV whilst the finishing processes are being carried out, it is held in a fixture, for example at the attachment portion 8. Thus, for example, the NGV may be held in one fixture whilst the cooling holes 10 are initially formed and then transferred to another fixture for the coating process.

After the coating process is complete, it is necessary to re-drill the cooling holes 10 to clear any blockages from the holes 10 which may have been caused by the coating process. This may entail supporting the NGV in a third fixture or returning it to the fixture used in the original drilling process. In either case, it is not possible to align the NGV in the drilling machine exactly with its position when the cooling holes 10 were initially formed.

In order to ensure that the re-drilling operation takes place accurately at the locations of the existing holes, it is necessary to align the NGV accurately with respect to the machine tool which is to perform the re-drilling operation. The machine tool may be, for example, a CNC laser drilling machine having a coordinate measuring machine (CMM). Alternatively the machine tool may be configured such that it includes the functionality of a co-ordinate measuring machine.

Figure 2:
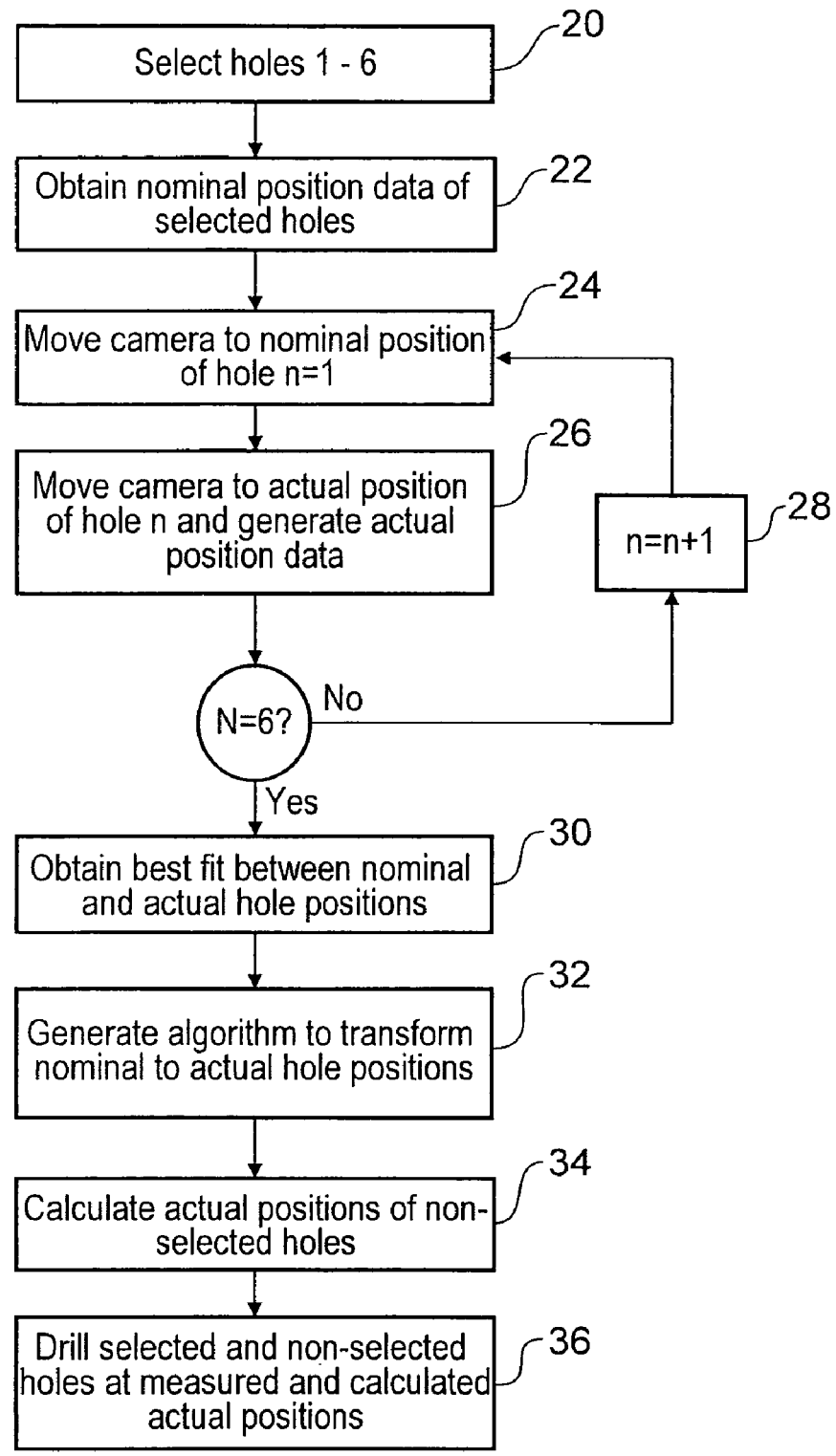
FIG. 2 is a flow chart representing a process for re-drilling cooling air holes of the nozzle guide vane of FIG. 1.

The sequence of operations executed by the machine tool is represented by the flow chart in FIG. 2. Initially, at step 20, a representative number of the cooling holes 10 is selected. At least 3 holes must be selected, and it is envisaged that, in most cases, 6 or 8 selected holes will be required. In FIG. 1, these holes are identified by arrows A to F. It is desirable for the selected holes to be oriented in different directions from each other, and preferably in directions which are as close as possible to three orthogonal axes of a coordinate system. Also, it is desirable for the holes to be relatively widely spaced apart from each other over the surface of the aerofoil portion 2. It is also desirable for at least some of the selected holes A to F to be those that are dimensioned on the definition of the NGV to constrain the overall array of holes 10.

In step 22 a camera which is controlled by the CMM, and which forms an image through the optical system of the laser by which drilling is to be accomplished, is moved to the nominal position of the first hole, for example the hole represented by the arrow A. In the context of the present invention, references to the "position" of a hole mean the intersection of the centreline of the hole with the surface of the aerofoil portion 2. In most cases, the NGV will not be accurately aligned with the position in which the holes 10 were initially formed, and consequently the hole A will not be precisely aligned at the nominal position at which the camera is directed. Instead, the hole will be offset slightly from this position, but still within the field of view of the camera. The CMM system is then moved, manually or automatically, to bring the hole to the centre of the field of view of the camera, for example established by means of cross-hairs. During displacement of the camera, focus is maintained on the surface of the aerofoil portion 2. By recording the movement of the camera, and any required change in focus, the CMM system is able to generate the actual position of the hole A in 3 dimensional space. This is step 26 as shown in the flow chart FIG. 2.

Once the actual position data for hole A has been generated and recorded, the camera is moved by the CMM to the nominal position of the next hole, B, as indicated by the loop 28. Thus, the camera records in turn the actual positions of all of the holes A to F. These positions are stored within the memory of the CMM which thus has a complete actual position data set for these selected holes, as well as the corresponding nominal position data set. Because the selected holes A to F are oriented at different directions from one another, the overall actual position data set contains significant positional information in each of the XY, YZ and XZ planes. For example, considering the coordinate system represented to the right of FIG. 1, it can be seen that hole pairs A and D, B and C and E and F provide significant data in the YZ, XY and XZ planes respectively.

In step 30 a best-fit analysis is performed between the actual and nominal positions of the holes A to F. Any appropriate form of best-fit analysis can be used, for example a 3-2-1 (plane, line, point) iterative alignment or a simultaneous best-fit alignment. Once a best-fit alignment has been established by relative translation and rotation of the nominal position data relative to the actual position data, respective scaling factors can be calculated for the X, Y and Z axes to improve the alignment fit.

The adjustment required in step 30 to achieve the best alignment fit, including the scaling factors, is then used in step 32 to generate an algorithm which will apply globally across the entire array from which the selected holes A to F are taken.

In step 34 this algorithm is applied to the non-selected holes 10 (i.e. all of the holes of the array except for holes A to F) to calculate the actual positions of these non-selected holes. These actual positions are then input to the drilling programme of the CNC machine which in step 36 performs the re-drilling operation on all of the holes 10 of the array.

It will be appreciated that the single NGV shown in FIG. 1 may have more than one array of holes 10. If that is the case, it is unlikely that the algorithm generated in step 32 for one array will be applicable to the holes of another array. Consequently, the entire process will need to be repeated for each array of holes 10 present on the component.

Because the positions of the holes 10 in each array will normally be positioned accurately with respect to each other, even if the array as a whole deviates from its nominal position on the aerofoil portion 2, the method described above will ensure that re-drilling of the holes 10 will take place accurately at the original drilling locations, regardless of cumulative process variations and component location inaccuracies. Although different arrays will require different conversion algorithms, it is nevertheless possible for more than one array on a single component to be analysed, and a respective number of algorithms to be generated, in a single machine cycle.

Since direct identification of the actual location is required for only a relatively small number of holes of the array, the method described above can be carried out very quickly, and consequently is suitable for large-scale production of aerofoil components or overhaul of such components.

By selecting holes orientated in different directions from each other, the method described above is able to employ 2 dimensional imaging of each hole to create an accurate 3 dimensional location of a complex hole array, and can therefore compensate for translational and rotational positioning inaccuracies, as well as compensating for scaling errors.

The method described above does not require direct contact between the component and a probe, for example a probe of a CMM, and so does not suffer from the disadvantages inherent in such techniques, such as operational slowness and the potential for mis-reading. The use of a camera to image the selected holes through the optical system of the drilling laser provides a visual output of the actual hole position which is easily and quickly human-verifiable.

The system is able to adapt hole position and the direction of any fanning or shaping of the hole at its junction with the aerofoil surface. Thus, the method described above can be used to form desired features at the exit of holes which are round in the initially drilled state. Thus, for example, the drilling procedure can accurately position shaped fans or flares at the hole exits, for example by using laser ablation. Ablation lasers are not good at drilling holes, and the present invention therefore makes it possible for the initial holes to be drilled using a drilling laser while features at the exits of the holes can then be formed accurately on the existing holes by means of the method of the present invention, using an ablation laser.

Although the present invention has been described with reference to aerofoil components, it will be appreciated that it can be employed for a wide range of products where an existing feature of the component needs to be found accurately to enable a further process to be conducted.

The invention claimed is:

1. A method of performing a process on an existing array of holes defined by a component, the method comprising:
   i) selecting at least three, but not all, of the holes of a first array;
   ii) identifying a nominal position in a coordinate space of each of the selected holes, and generating a nominal position data set for the selected holes;
   iii) identifying the actual position in the coordinate space of each of the selected holes, and generating an actual position data set for the selected holes;
   iv) generating an algorithm to transform the nominal position data set to the actual position data set of the first array;
   v) applying the algorithm to the nominal positions of the non-selected holes of the first array to generate actual positions of the non-selected holes; and
   vi) performing the process on the selected and non-selected holes at the respective identified and generated actual positions.

2. The method of claim 1, wherein the nominal positions of the selected holes are obtained from data stored in a memory of a coordinate measuring machine.

3. The method of claim 1, wherein the actual positions of the selected holes are obtained by capturing and analysing a camera image of each selected hole.

4. The method of claim 3, wherein the camera image is obtained through the optical system of a laser, and step iii) includes initially directing the camera at the nominal position of the respective selected hole and displacing the camera's direction to the actual position of the respective selected hole on the basis of an output of the analysis of the camera's image.

5. The method of claim 1, wherein in step iv), the algorithm is generated by performing a best fit alignment of the actual position data set with the nominal position data set and calculating the offset between the actual and nominal position data sets.

6. The method of claim 5, wherein the best fit alignment is established by relative translation and rotation of the nominal position data relative to the actual position data.

7. The method of claim 1, wherein the component is an aerofoil component of a gas turbine engine and the holes are cooling holes.

8. An apparatus for performing with the method of claim 1, the apparatus comprising:
   i) a memory for storing the nominal position data set and the actual position data set;
   ii) a camera;
   iii) a coordinate measuring machine for displacing the camera to camera positions corresponding to the nominal positions of the respective selected holes;
   iv) image analysis means for receiving images from the camera and identifying the actual positions of the respective selected holes;
   v) calculation means for generating the algorithm and subsequently calculating the actual positions of the non-selected holes; and
   vi) processing means for performing the process on the selected and non-selected holes at the respective identified and generated actual positions.

9. The method of claim 1, further comprising the step of providing a coating on the component before step i).

10. The method of claim 1, wherein six or eight holes of each array are selected.

11. The method of claim 1, wherein at least some of the selected holes are orientated in different directions from each other.

12. The method of claim 11, wherein each of the different directions are substantially aligned with one of three orthogonal axes of a three-dimensional coordinate space, X, Y, and Z.

13. The method of claim 12, wherein the algorithm includes scaling factors for each of the X, Y, and Z directions.

14. The method of claim 1, wherein steps i) to vi) are repeated for each array of holes present on the component.

15. A method of performing re-drilling on an existing array of holes defined by a component, the method comprising:
   i) selecting at least three, but not all, of the holes of a first array;
   ii) identifying a nominal position in a three-dimensional coordinate space of each of the selected holes, and generating a nominal position data set for the selected holes;
   iii) identifying the actual position in the three-dimensional coordinate space of each of the selected holes, and generating an actual position data set for the selected holes;

iv) generating an algorithm to transform the nominal position data set to the actual position data set of the first array;
v) applying the algorithm to the nominal positions of the non-selected holes of the first array to generate actual positions of the non-selected holes; and
vi) re-drilling the selected and non-selected holes at the respective identified and generated actual positions.

* * * * *